Figure 6:
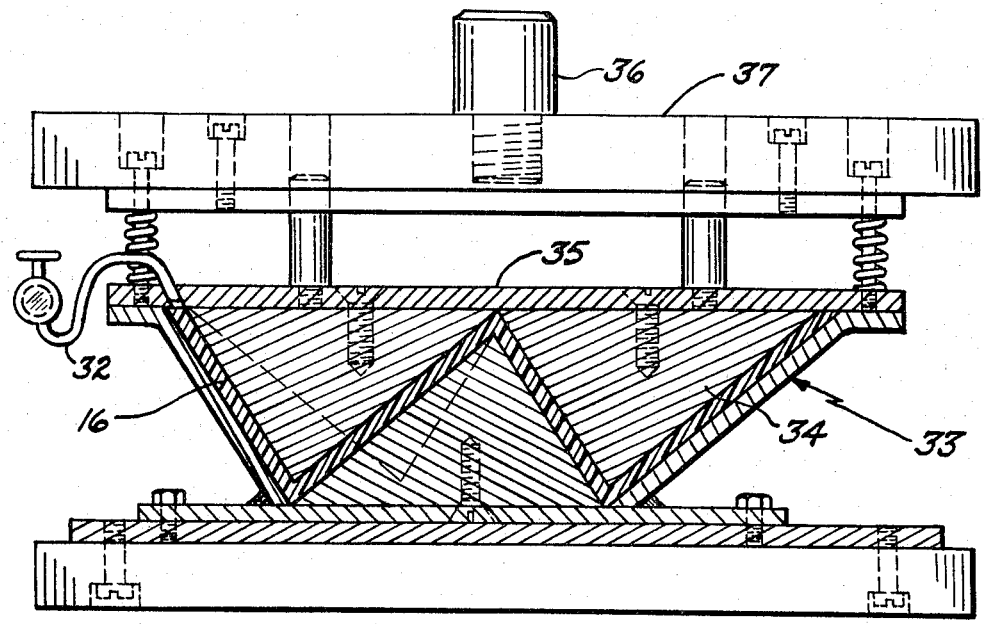

March 21, 1967  J. B. BRAUER  3,310,804
ISOTROPIC MICROWAVE REFLECTOR
Original Filed June 18, 1963  4 Sheets-Sheet 1
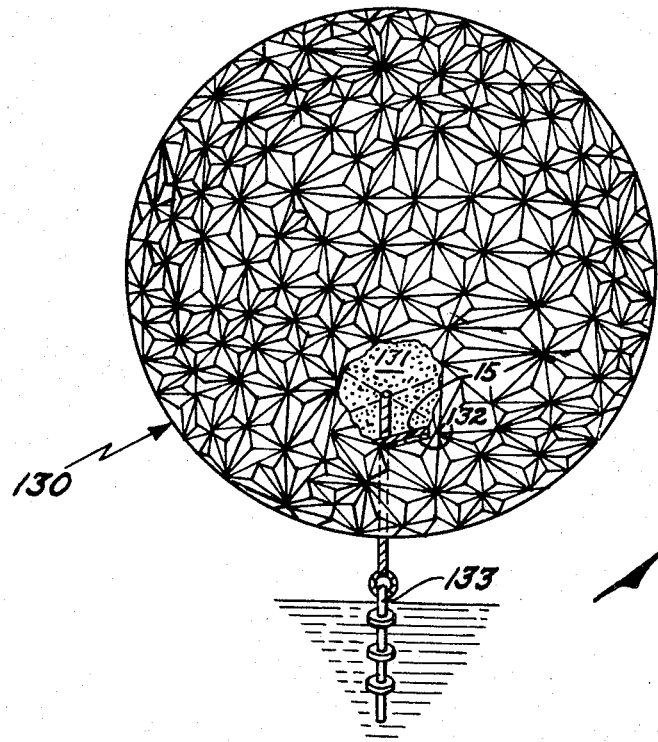
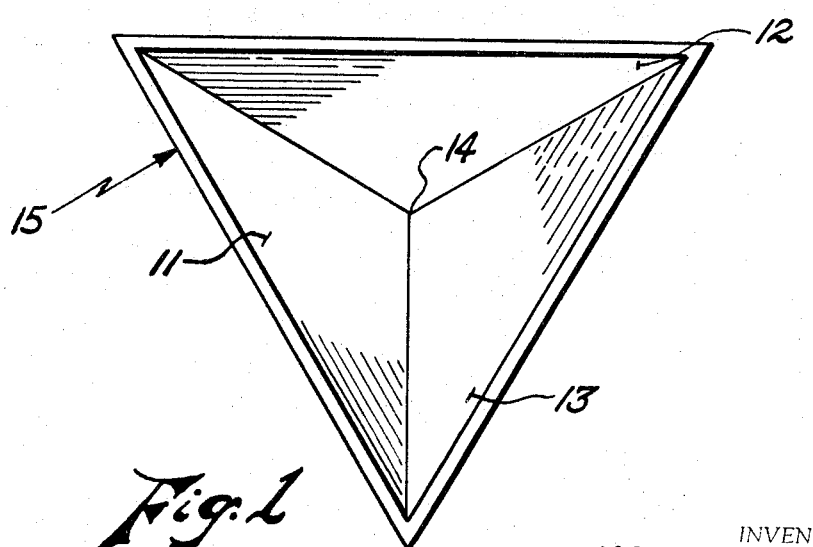
INVENTOR.
JOSEPH B. BRAUER
BY Harry A. Herbert Jr
Julian L. Siegel and
ATTORNEYS March 21, 1967  J. B. BRAUER  3,310,804
ISOTROPIC MICROWAVE REFLECTOR
Original Filed June 18, 1963  4 Sheets-Sheet 2

INVENTOR.
JOSEPH B. BRAUER
BY Harry A. Herbert Jr
Julian L. Siegl
ATTORNEYS

March 21, 1967  J. B. BRAUER  3,310,804
ISOTROPIC MICROWAVE REFLECTOR
Original Filed June 18, 1963  4 Sheets-Sheet 3
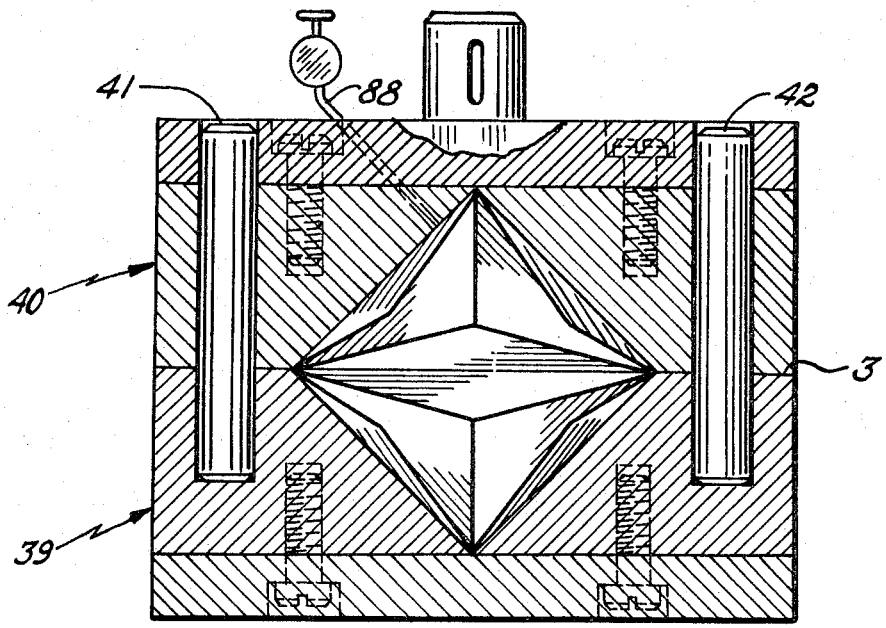
Fig. 7
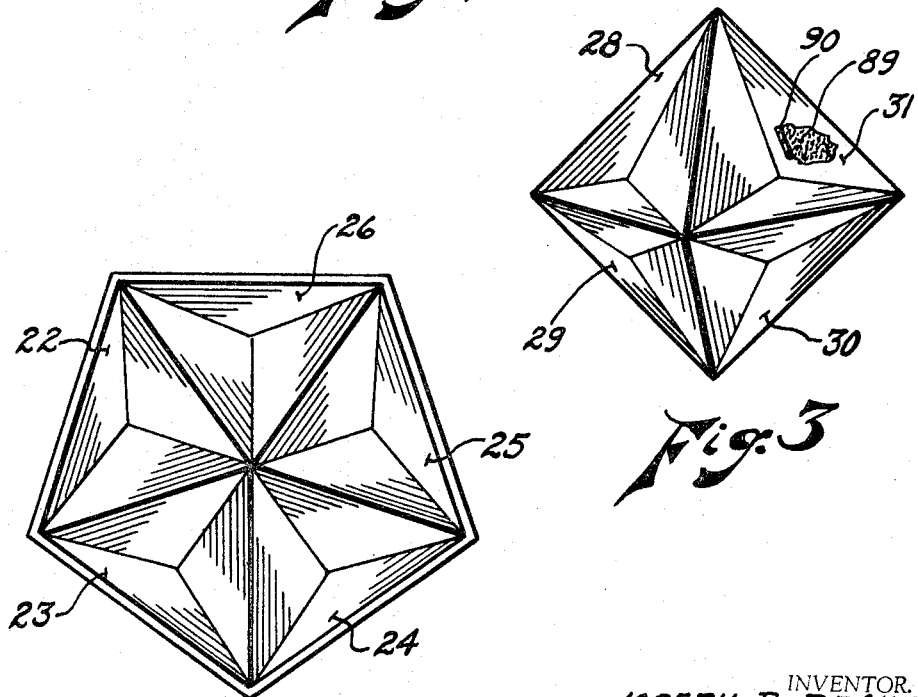
Fig. 3
Fig. 4
INVENTOR.
JOSEPH B. BRAUER
BY
ATTORNEYS

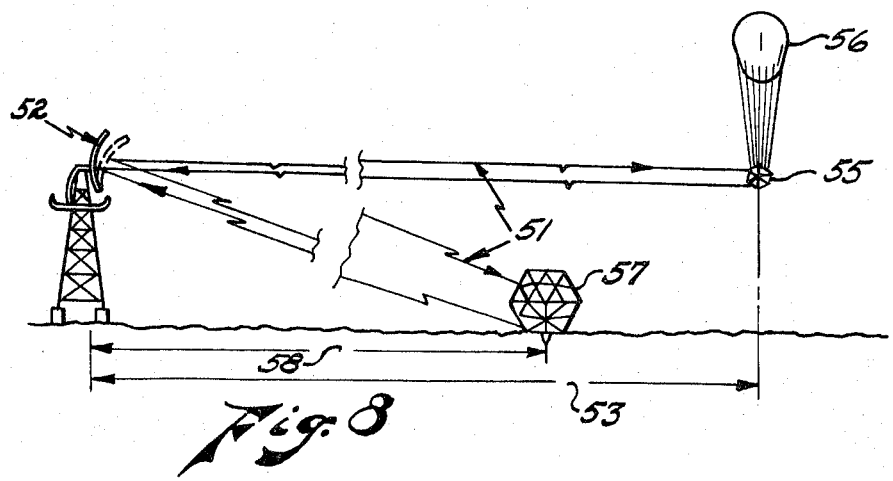
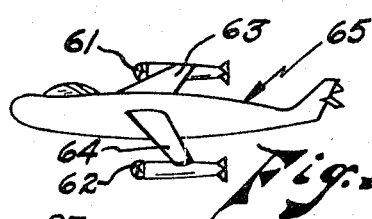
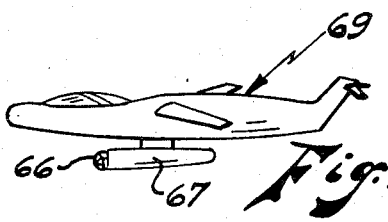
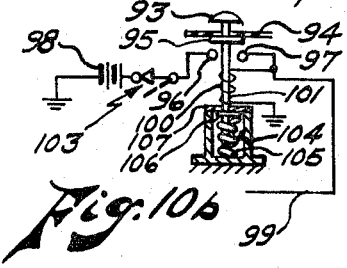
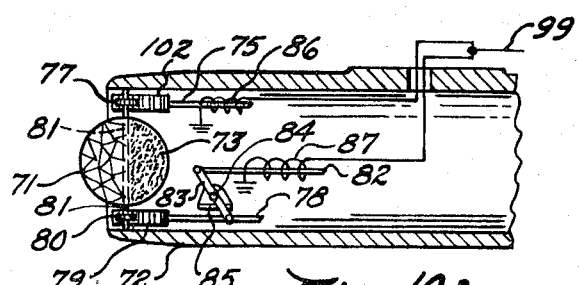
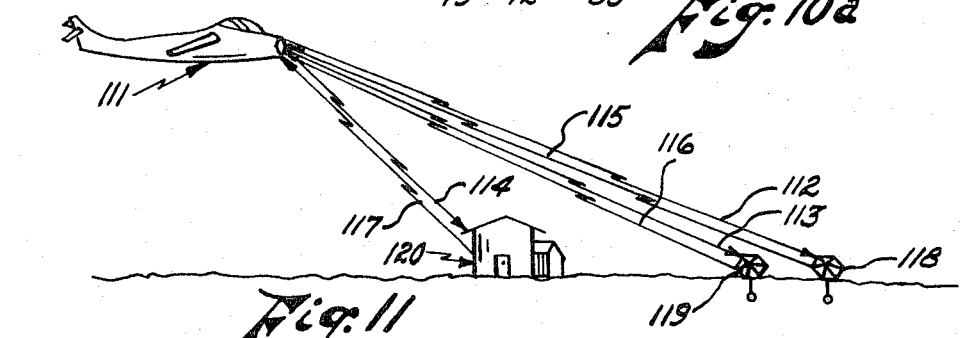

United States Patent Office 3,310,804
Patented Mar. 21, 1967

3,310,804
ISOTROPIC MICROWAVE REFLECTOR
Joseph B. Brauer, Rome, N.Y., assignor to the United States of America as represented by the Secretary of the Air Force
Original application June 18, 1963, Ser. No. 288,840. Divided and this application Dec. 9, 1965, Ser. No. 516,207
2 Claims. (Cl. 343—18)

The invention described herein may be manufactured and used by or for the United States Government for governmental purposes without payment to me of any royalty thereon.

This application is a division of my copending application Serial No. 288,840, filed June 18, 1963.

This invention relates to microwave reflectors, and more particularly to the fabrication of isotropic microwave reflectors.

An isotropic microwave reflector is a reflector that reflects the wave back in the same direction as the incident wave regardless of the direction of the incident wave. This will occur by using "corner reflectors" which is the name commonly given to devices constructed with three mutually perpendicular reflecting planes whose intersection lie at a common point about an axis about which the planes are equispaced. Incident electromagnetic energy entering the open face of the inverted pyramid formed by the planes is reflected from two planes of this reflector in such a manner that it is returned parallel to the incident path with no reduction in total incident energy save that due to quality of the reflective surface.

The invention is based on the use of numerous individual corner reflectors mounted with their open faces lying on the plane surfaces of a regular polyhedron. Since the open face of the corner reflector forms an equilateral triangle on a plane normal to the axis of the reflector, there is the further requirement that the appropriate regular polyhedron have equilateral triangles for external faces or other polygon surfaces which can be extended in such a manner to form triangular faces.

The ideal isotropic reflector should therefore consist of a regular polyhedron with equilateral triangular faces and should approximate a spherical body, presenting a uniform array of individual corner reflector to radiation incident from any direction. The relatively broad beam or angle of incidence tolerance (deviation from the true axis) for radiation which the corner reflector will accept and return allows the use of polyhedra with relatively few faces, only roughly approximating a sphere.

An object of this invention is to provide for a radiant energy reflector that will cause a reflected wave to be parallel to the incident wave.

Another object is to provide for a method of calibrating radar.

Another object is to provide for a method of making aircraft or other vehicles easily detected by radar.

Another object is to provide for a better camouflage in order to confuse enemy radar.

Figure 2:
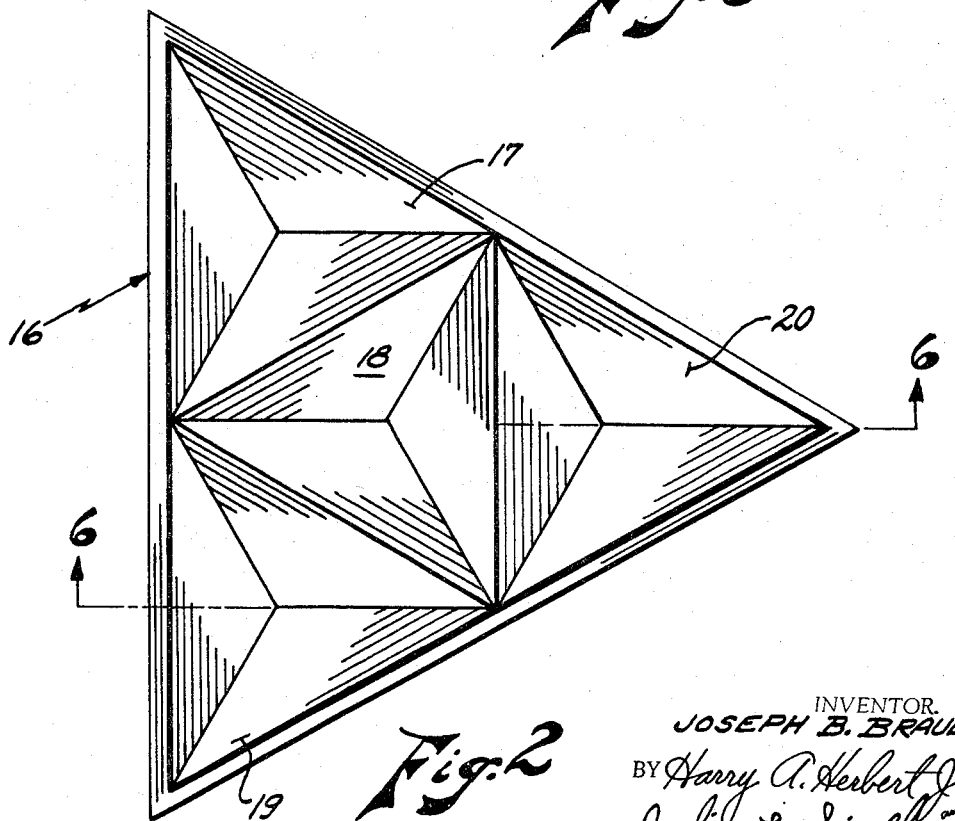

These and other objects and features of the inevntion will more fully appear from the drawings in which:

FIG. 1 shows a single corner reflector;
FIG. 2 shows a front view of a solid sector of the polyhedron showing a single equilateral triangular face further divided into four smaller equilateral triangular faces;
FIG. 3 shows an isotropic microwave reflector in the form of an octahedron;
FIG. 4 shows a solid sector of the polyhedron in form of a pentagon which has been further divided into five equilateral triangular faces.
FIG. 5 shows an isotropic microwave reflector in the form of polyhedron of multiple sides sufficiently numerous to approach a spherical configuration; the figure also showing a method of anchorage to ground;
FIG. 6 shows the mold used to form a solid sector of the polyhedron shown in cross section along lines at 6—6 of FIG. 2;
FIG. 7 shows a mold designed to cast an isotropic microwave reflector in one piece;
FIG. 8 shows a method of calibrating a ground mounted radar using a ground mounted target and a method of serial calibration using a target suspended from a balloon;
FIGS. 9(a) and 9(b) show methods of mounting isotropic microwave targets in an aircraft for better radar detection;
FIGS. 10(a) and 10(b) show methods of rotating the polyhedron to prevent easy radar detection; and
FIG. 11 shows a method of using the microwave reflector for purposes of camouflage.

Referring now to the drawings in more detail, FIG. 1 shows the basic corner reflector made up of three mutually perpendicular right triangles 11, 12, 13 joining at vertex 14 and forming equilateral triangle 15.

As shown in FIG. 2 each equilateral triangle 16 can be divided into four smaller equilateral triangles 17, 18, 19, and 20 each in turn having the same properties as shown in FIG. 1. This process of dividing the equilateral triangle can be continued in order to make the polyhedron more closely approach a sphere thus reducing or eliminating slight variations in returned radiation as a function of position of the incident beam.

The simplest form of a polyhedron suitable for use as an isotropic microwave reflector is the tetrahedron having four triangular faces.

FIG. 3 shows a variation of the polyhedron in the form of an octahedron which has eight corner reflectors and eight equilateral triangular faces. Four corner reflectors 28, 29, 30, 31 are shown. Construction of the reflector is shown with foam base 89 and reflecting surface 90.

Other variations of the polyhedron are possible such as the dodecahedron which has twelve pentagon faces and as shown in FIG. 4; each pentagon face can be further divided into five equilateral triangles 22, 23, 24, 25, 26. Hence the dodecahedron would have sixty triangular faces.

FIG. 5 shows an isotropic microwave target 130 showing small corner reflectors 15 sufficiently numerous to cause the polyhedron to the desired surface. Construction is shown with foam base 131 and reflecting surface 132.

There are many possible variations of simple or mixed polyhedron which can be used to achieve the desired size and distribution of individual corner reflectors composing the isotropic reflector. These variations may be applied in order to match the measurements of the individual reflector to the frequency radiation for which it is to be used by increasing the total number of individual reflectors in a single face of the polyhedron or to make the polyhedron more closely approach a sphere, thus reducing or eliminating slight variations in returned radiation as a function of position of the incident beam.

Referring to FIG. 8, the isotropic microwave reflector can be used for calibration of ground radar sets using a ground mounted target 57 to determine microwave return and geographic location, thereby eliminating precise surveying of a reflector location and angular orientation. The only measurement needed would be distance from the radar set 58. To make aerial calibration of ground mounted radar, the isotropic microwave reflector 55 could be suspended from balloon 56 sent up at a desired distance from the radar set 53.

Radar pulses 51 transmitted, from antenna 52 strike the ground mounted microwave reflector 57 or the suspended reflector 55 and are reflected back to the antenna with little loss of energy.

The invention can also be used to increase radar cross-section of aircraft for easier and more precise detection by friendly radar in air and ground traffic control systems, or to cause a small aircraft to appear much larger to an enemy, or to cause a single plane to appear as more than one, generating confusion prior to or during attack. In FIG. 9(a) small reflectors 61 and 62 can be mounted in the wing tips 63 and 64 of aircraft 65, or in FIG. 9(b), reflector 66, can be mounted on fuel tank 67 of aircraft 69.

The reflector could be mounted so as to rotate in order to eliminate the high reflection when desirable as shown in FIG. 10(a). A polyhedron 71, is mounted on the structure 72 of an aircraft in order to increase reflectivity. If it becomes necessary to eliminate this high reflectivity the polyhedron can be rotated 180° which would then expose a non-reflecting surface 73. This rotation can be accomplished by causing rod 75 to move which is connected to rack 102 which turns gear 77 which in turn is connected to the upper end of axle 81 running through polyhedron 71. At the same time rod 78 is caused to move in the opposite direction as rod 75 by linking rod 78 to rod 82 by means of lever 83 turning at pivot point 84 which is attached to structure 72 by bracket 85 and then causing rod 82 to move in the same direction as rod 75. Rod 78 is connected to rack 79 which turns gear 80 which is connected to the lower end of axle 81. With rods 75 and 78 moving in opposite directions, the polyhedron is caused to rotate. Rods 75 and 82 are actuated by electric current in coils 86 and 87 which encircle the rods.

Referring to FIG. 10(b) which shows the switch assembly that controls current flow in coils 86 and 87, when button 93 mounted in panel 94 is depressed, crossbar 95 joins contacts 96 and 97 thus closing the switch. Voltage source 98 causes electric current to flow in wire 99 which is connected to coils 86 and 87 at the same time current is caused to flow in coil 100 which encircles rod 101 that is connected to button 93. Rod 101 and coil 100 act as a solenoid thereby keeping the switch in the closed position. Rod 101 enters chamber 104 which contains spring 105. When button 93 is depressed spring 105 is compressed between collar 106 and detent 107.

In order to cause the polyhedron to reverse its rotation and again expose the side of high reflectivity, switch 103 which is normally closed is opened thereby breaking the circuit. Current ceases to flow in coil 100 and spring 105 acting on collar 106 causes rod 101, cross bar 95, and button 93 to be raised to its original position. Current also ceases to flow in wire 99 and coils 86 and 87 at FIG. 10(a) and a spring not shown acting on axle 81 returns the polyhedron to its original position of high reflectivity.

The invention can be used as camouflaging device in order to deceive enemy radar by using a complex of reflectors to duplicate reflecting characteristics of existing buildings or landmarks or totally obliterating a target by saturating the target area with high return reflectors as shown in FIG. 11. Aircraft 111 sends out radar signals 112, 113, 114, and receives reflected signals 115, 116, 117. Although isotropic microwave reflectors 118 and 119 are smaller than structure 120, they will appear to be of equal size to the radar in aircraft 111 due to the high reflectivity of the isotropic microwave reflectors.

Another use is as an aid to investigation of various parameters of microwave systems under development or test, such as field intensity distribution.

The polyhedron can be fabricated either by casting solid sectors and then assembling them or by casting the entire body of the reflector in one piece.

Where sufficient numbers of the reflectors are required to justify higher initial mold cast, a suitable mold, split to allow for removal of the cast part, could be designed to enclose the entire body of the reflector and the body could be cast in one piece of foam plastic or other light weight material. Such a mold is shown in FIG. 7 which is split at line 3 to allow it to be open for removal of the polyhedron. The mold is composed of drag assembly 39 and cope assembly 40 which are kept in alignment by guides 41 and 42 which are press fitted into drag assembly 39. The mold material can be poured through feed line 86.

Where only a few reflectors of a particular size or configuration are required a mold such as shown in FIG. 6 could be designed to enclose the volume contained in solid sector 16 of the polyhedron. The solid sector may then be formed by casting a low density from plastic or other material in this mold cavity. The material is poured into the feed line 32 and then into the mold 33 which includes drag assembly 34 and cope assembly 35. Upper platen 37 is attached to shank 36 which is in turn attached to ram of press not shown to insure proper pressure on mold 33.

The conductive coating required to reflect microwave radiation can be applied in either of two manners. A hot metal spray coating can be applied to mold over a mold release coating and the foam plastic or other material would be subsequently introduced so as to bond the spray coating during the casting operation. Another manner of coating would be, after casting is completed, to spray, dip, or paint application of a metal paint, or other conductive coating which would adhere to the base material.

If desired, the entire reflector could be made of sheet metal as a hollow polyhedron or may be cast of a foamed metal such as aluminum or magnesium for a more rugged structure requiring no separate reflective coating.

Weather proofing of the reflector may be accomplished as a final step in the fabrication by coating with an epoxy or other weather-proof organic resin, or spraying on a thin layer of foam.

What I claim is:

1. An aircraft electromagnetic energy reflecting system comprising:
   (a) first reflecting unit including a polyhedron having a reflecting surface and a non-reflecting surface, said reflecting and non-reflecting surfaces facing in opposite directions along a common axis of symmetry passing through said surfaces, the reflecting surface having a multiplicity of sides sufficiently numerous to produce an overall reflecting configuration that is substantially hemispherical, each of said sides including in the surface thereof a depressed portion forming a re-entrant angle, all of said depressed portions serving as corner reflectors;
   (b) and means including a rotatable axle affixed to said polyhedron for rotating the polyhedron through an angle of 180 degrees for selectively exposing in fixed positions either said reflecting surface or said non-reflecting surface to electromagnetic energy received by said reflecting system.

2. An aircraft energy reflecting system according to claim 1 which further comprises a second reflecting unit, each of the reflecting units being located at the lateral extremities of the aircraft.

References Cited by the Examiner
UNITED STATES PATENTS

| | | | |
|---|---|---|---|
| 2,310,790 | 2/1943 | Jungersen | 343—18 |
| 2,770,801 | 11/1956 | Jones | 343—18 |
| 2,917,739 | 12/1959 | Halpern | 343—18 |
| 3,016,532 | 1/1962 | Del Mar | 343—18 |
| 3,039,093 | 6/1962 | Rockwood | 343—18 |

CHESTER L. JUSTUS, *Primary Examiner.*

J. P. MORRIS, *Assistant Examiner.*